US005926157A

United States Patent [19]

Moon

[11] Patent Number: 5,926,157

[45] Date of Patent: Jul. 20, 1999

[54] VOLTAGE DROP COMPENSATING DRIVING CIRCUITS AND METHODS FOR LIQUID CRYSTAL DISPLAYS

[75] Inventor: Seung-Hwan Moon, Seoul, Rep. of Korea

[73] Assignee: Samsung Electronics Co., Ltd., Suwon, Rep. of Korea

[21] Appl. No.: 08/782,399

[22] Filed: Jan. 13, 1997

[30] Foreign Application Priority Data

Jan. 13, 1996 [KR] Rep. of Korea .......................... 96-579

[51] Int. Cl.[6] ........................................ G02F 1/13

[52] U.S. Cl. .................................. 345/89; 345/58; 345/98

[58] Field of Search .................................. 345/58, 89, 94, 345/98, 100

[56] References Cited

U.S. PATENT DOCUMENTS

| | | | |
|---|---|---|---|
| 4,921,334 | 5/1990 | Akodes | 345/89 |
| 5,008,657 | 4/1991 | Hanson et al. | 345/74 |
| 5,220,315 | 6/1993 | Clerc | 345/93 |
| 5,434,599 | 7/1995 | Hirai et al. | 345/100 |
| 5,619,221 | 4/1997 | Hirai et al. | 345/58 |
| 5,621,439 | 4/1997 | Okada et al. | 345/211 |
| 5,625,373 | 4/1997 | Johnson | 345/58 |
| 5,646,643 | 7/1997 | Hirai et al. | 345/100 |
| 5,670,973 | 9/1997 | Bassetti, Jr. | 345/58 |

FOREIGN PATENT DOCUMENTS

| | | |
|---|---|---|
| 0 455 204 A3 | 11/1991 | European Pat. Off. . |
| 0 606 763 A1 | 7/1994 | European Pat. Off. . |
| 3314778 A1 | 11/1983 | Germany . |

OTHER PUBLICATIONS

European Search Report, App. 97300149.8, May 2, 1997.

*Primary Examiner*—Jeffery Brier
*Assistant Examiner*—Vincent E. Kovalick
*Attorney, Agent, or Firm*—Myers Bigel Sibley & Sajovec

[57] ABSTRACT

Thin film transistor-liquid crystal displays (TFT-LCDs) are driven to compensate for voltage drops on a common electrode, and to thereby reduce or eliminate cross-talk. The TFT-LCD includes a plurality of liquid crystal cells and a plurality of thin film transistors, a respective pair of which is serially connected between a common electrode and a plurality of drivers. A sensor senses a voltage drop on the common electrode. A compensator is responsive to the sensor, to provide at least one driver signal level to the plurality of drivers, which are a function of the sensed voltage drop on the common electrode. Distortions in the liquid crystal cells which are caused by the voltage drop on the common electrode may thereby be reduced or eliminated. Improved TFT-LCDs and driving circuits and methods are thereby provided.

23 Claims, 6 Drawing Sheets

FIG.6
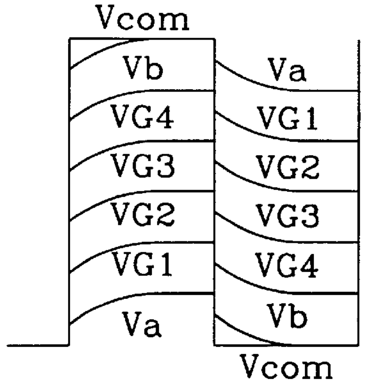
FIG.7A
FIG.7B
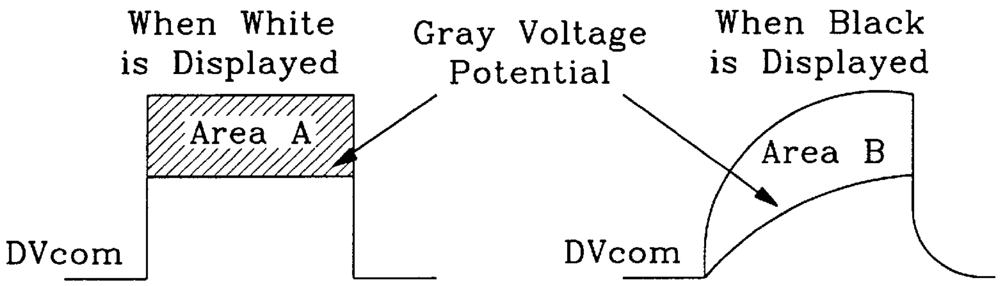
FIG.8 (Prior Art)
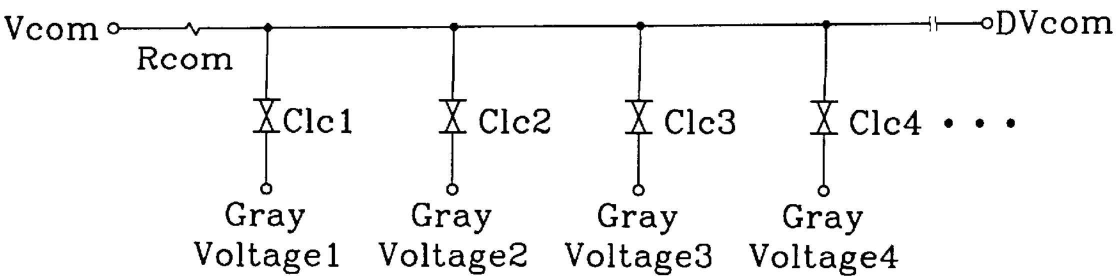

Waveform of A Voltage Applied to a Common Electrode

Output Voltage Waveform of a Common Electrode When White or Black is Displayed

VOLTAGE DROP COMPENSATING DRIVING CIRCUITS AND METHODS FOR LIQUID CRYSTAL DISPLAYS

FIELD OF THE INVENTION

This invention relates to liquid crystal display devices, and more particularly to driving circuits and methods for liquid crystal display devices.

BACKGROUND OF THE INVENTION

Thin film transistor-liquid crystal displays (TFT-LCD) are widely used for flat panel display devices in many applications. The TFT-LCD is an especially useful liquid crystal display because the TFT-LCD is capable of a large contrast ratio and may be readily adapted for color displays. In addition, because large screens can be made without reducing image quality, the TFT-LCD is expected to be applied to high definition TV and other fields.

As is well known to those having skill in the art, a TFT-LCD includes a plurality of liquid crystal cells and a plurality of thin film transistors, a respective pair of which is serially connected between a common electrode and a plurality of drivers.

Unfortunately, crosstalk may be produced in a TFT-LCD. For example, the crosstalk from a white or black area which is displayed may influence the surrounding cells to display different gray voltage levels than is intended, thereby producing a blurred image.

There are two general types of crosstalk: vertical crosstalk and horizontal crosstalk. Vertical crosstalk may be generated when a thin film transistor is not fully turned off because the unwanted gray voltage which is applied by a data line connected to the source of the thin film transistor, is transferred to the liquid crystal cell through the drain terminal of the thin film transistor. Horizontal crosstalk may be generated when a desired gray voltage is not applied to a liquid crystal cell because of potential differences between two adjoining liquid crystal cells which are connected to the common electrode. The potential difference may cause current to flow to adjacent liquid crystal cells rather than only to a selected liquid crystal cell.

FIGS. 8, 9A, 9B, 10A and 10B graphically illustrate crosstalk in a TFT-LCD. FIG. 8 is an equivalent circuit of a TFT-LCD which omits the thin film transistor connected to each liquid crystal cell. As shown, the voltage Vcom is applied to a common electrode having an internal resistance Rcom. Clc1, Clc2 . . . are the associated capacitances of a liquid crystal cell.

In a conventional TFT-LCD as illustrated in FIG. 8, the voltage applied to the liquid crystal cell is the difference between the common electrode voltage Vcom and the gray voltage which is applied via the thin film transistor. The brightness of a cell is determined based upon the voltage which is applied to the liquid crystal cell.

Generally, when white is displayed, the voltage potential difference between the common electrode and the gray voltage terminal of a liquid crystal cell is at a minimum and when black is displayed, the potential difference between the common electrode and the gray voltage terminal is a maximum. Therefore, the amount of electric charge in the liquid crystal cell is generally a minimum for white and a maximum for black. Accordingly, the amount of current flowing in the common electrode is generally a minimum for white and a maximum for black. Thus, the amount of current which flows in the common electrode changes based on the displayed level.

FIG. 9A is a waveform illustrating the voltage which is applied to the common electrode. FIG. 9B is an output waveform of the voltage at the common electrode. As shown in FIG. 9B, when white is displayed, there is generally no distortion in the common electrode voltage waveform. However, when black is displayed, distortion generally occurs in the common electrode voltage waveform. This distortion is generally attributed to the internal resistance of the panel. Due to this internal resistance, the amount of current flowing in the common electrode is greater when black is displayed, and the voltage drop difference influences the common electrode waveform.

FIG. 10A illustrates a common electrode voltage waveform which is applied to two terminals of a liquid crystal cell for white, and Figure 10B illustrates the common electrode voltage waveform for black. As shown in FIG. 10A, the upper potential is a common electrode voltage and the lower potential is a gray voltage potential. In FIG. 10B, the upper potential is a common electrode voltage and the lower potential is a gray voltage.

As shown in FIGS. 10A and 10B, the areas A and B represent the total amount of charge in a liquid crystal cell. As also shown in FIGS. 10A and 10B, the common electrode voltage potential of a cell is different depending on whether white or black is displayed, due to the distortion of the common electrode voltage. Thus, the area A is generally different from the area B. The difference between the two areas can cause the difference between the gray display. Therefore, even though the same gray voltage level is applied to a liquid crystal cell, the display intensity in the cell is different based on the display in the surrounding cells.

It is known to reduce the above-identified differences in areas by reducing the resistance value of the panel (Rcom). Although this may reduce crosstalk, high performance applications of TFT-LCD displays may demand further cross-talk reductions. Moreover, as the size of the liquid crystal display panel increases, the resistance of the common line also tends to increase. Thus, the distortion generally increases in proportion to the increase in the panel size. Crosstalk therefore continues to be a problem in the TFT-LCD.

SUMMARY OF THE INVENTION

It is therefore an object of the present invention to provide improved thin film transistor-liquid crystal displays (TFT-LCD) and driving circuits and methods therefor.

It is another object of the present invention to provide TFT-LCDs and driving circuits and methods therefor which are capable of reducing crosstalk.

These and other objects are provided according to the present invention by TFT-LCD devices and driving circuits and methods, which sense a voltage drop on the common electrode and which compensate for this voltage drop. In particular, at least one driver signal level is provided to the plurality of drivers, wherein the at least one driver signal level is a function of the sensed voltage drop on the common electrode. Distortions in the liquid crystal cells which are caused by the voltage drop on the common electrode may thereby be reduced.

In a preferred embodiment of the present invention, the compensator includes a level shifter and a gray scale voltage generator. The level shifter is responsive to the magnitude of the sensed voltage drop on the common electrode to generate first and second voltages. The gray scale voltage generator is responsive to the first and second voltages, to generate more than two gray scale voltages and to apply the more than two gray scale voltages to the plurality of drivers.

The sensor preferably includes a pad which is electrically connected to the common electrode.

In particular, the plurality of drivers are preferably included in a driver integrated circuit. The driver integrated circuit preferably includes a circuit for applying a common voltage to the common electrode, and also preferably includes the sensor which senses a voltage drop on the common electrode. Accordingly, first and second pads may be connected to the common voltage electrode so that the common voltage is applied to the first pad and the sensor is connected to the second pad. If the sensor senses insufficient voltage, the voltage drop may be amplified.

In a preferred embodiment of the present invention, the level shifter includes a plurality of first diodes which are serially connected in a first polarity between a voltage which is complementary to a voltage which is applied to the common electrode and a voltage which is sensed on the common electrode. A like plurality of second diodes are also included, which are serially connected in a second polarity opposite the first polarity, between the voltage which is complementary to the voltage which is applied to the common electrode and a voltage which is sensed on the common electrode. A pair of reference taps tap at least a pair of intermediate nodes between the plurality of first diodes and the like plurality of second diodes.

The gray scale voltage generator preferably comprises a plurality of resistors which are serially connected between the pair of reference taps, and a plurality of resistor taps between adjacent ones of the resistors. The resistor taps are used to apply the gray scale voltages to the driver.

Accordingly, the generated gray scale voltages are proportional to the distorted level of the common electrode voltage. Thus, a constant potential may be applied to a liquid crystal cell without interference from adjacent cells. The generated gray voltage is thus proportional to the distorted level of the common electrode voltage, even though the common electrode voltage is distorted because of the gray voltage applied to adjacent cells. Thus, crosstalk may be reduced or eliminated.

BRIEF DESCRIPTION OF THE DRAWINGS

FIG. 6 is a waveform diagram which illustrates an embodiment of a gray voltage from the gray voltage generator of FIG. 1.

FIGS. 7A and 7B are waveforms illustrating a voltage which is applied to an adjacent cell when white and black, respectively, is displayed.

FIG. 8 is an equivalent circuit diagram of a conventional liquid crystal panel.

DETAILED DESCRIPTION OF PREFERRED EMBODIMENTS

Figure 1:
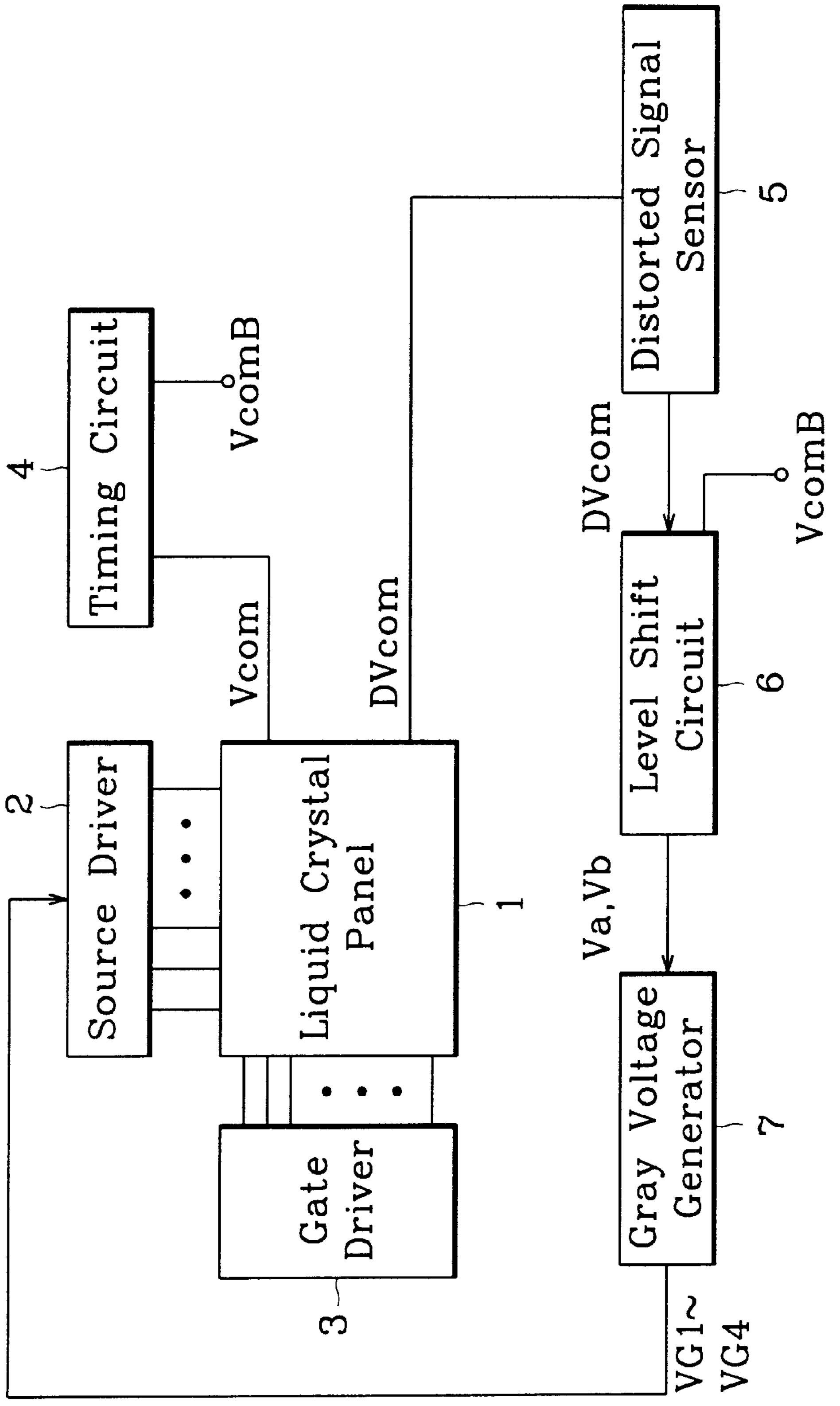
FIG. 1 is a block diagram of a thin film transistor-liquid crystal display (TFT-LCD) including driving circuits and methods according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIG. 1, a thin film transistor-liquid crystal display (TFT-LCD) according to the present invention includes a liquid crystal panel 1 which includes a plurality of liquid crystal cells and a plurality of thin film transistors. A liquid crystal cell responds to the output voltage at the drain of a corresponding thin film transistor. The TFT-LCD also includes a gate driver 3 and a source driver 2 which respectively are connected to the gate terminal and the source terminal of each TFT. A timing circuit 4 generates a common electrode voltage Vcom. The timing circuit 4 also preferably generates a complementary voltage to the common electrode voltage, referred to as VcomB. These elements of a TFT-LCD are well known to those having skill in the art and need not be described further herein.

According to the invention, TFT-LCD also includes a distorted signal sensor 5 which is connected to the liquid crystal panel 1 and which senses a voltage drop on the common electrode. A compensator is also included, which is responsive to the sensor, to provide at least one driver signal level to the plurality of drivers. The at least one driver signal level is a function of the sensed voltage drop on the common electrode, to thereby reduce distortions in the liquid crystal cells which are caused by the voltage drop on the common electrode.

As shown in FIG. 1, the compensator includes a level shift circuit 6 and a gray voltage generator 7. The level shift circuit 6 receives an output signal DVcom from the distorted signal sensor 5 and the complementary common electrode voltage VcomB from the timing circuit 4, and generates gray reference voltages Va and Vb. The gray voltage generator 7 receives reference voltages Va and Vb and generates and outputs at least three gray voltages VG1 . . . VG4. As shown in FIG. 1, these voltages are applied to source driver 2.

Figure 2:
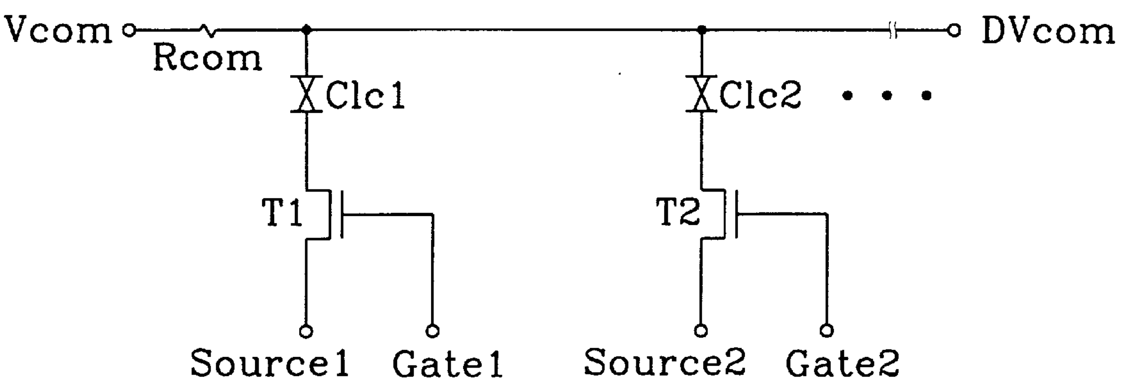
FIG. 2 is an equivalent circuit for the liquid crystal panel of FIG. 1.

Referring now to FIG. 2, the equivalent circuit of the liquid crystal panel 1 of FIG. 1 is shown. As shown in FIG. 2, the liquid crystal panel includes a plurality of liquid crystal cells Clc1, Clc2 . . . and a plurality of thin film transistors T1, T2 . . . A respective liquid crystal cell is connected to a respective thin film transistor. As shown, a liquid crystal cell and a thin film transistor are serially connected between the common electrode and a plurality of drivers. In particular, each liquid crystal cell includes a pair of terminals, one of which is connected to the drain of the corresponding thin film transistor and the other of which is connected to the common electrode voltage Vcom. As shown in FIG. 2, the liquid crystal panel also has a panel resistance Rcom between the common electrode voltage and the liquid crystal cells. According to the invention, a distorted common electrode voltage DVcom is detected in a node between the panel resistance Rcom and the liquid crystal cells.

Still referring to FIG. 2, the signals from gate driver 3 of FIG. 1 are applied to the gate terminals of the thin film transistors labelled Gate1, Gate2 . . . in FIG. 2. The signals from the source driver 2 are applied to the source terminals labelled Source1, Source2 . . . in FIG. 2.

Figure 3:
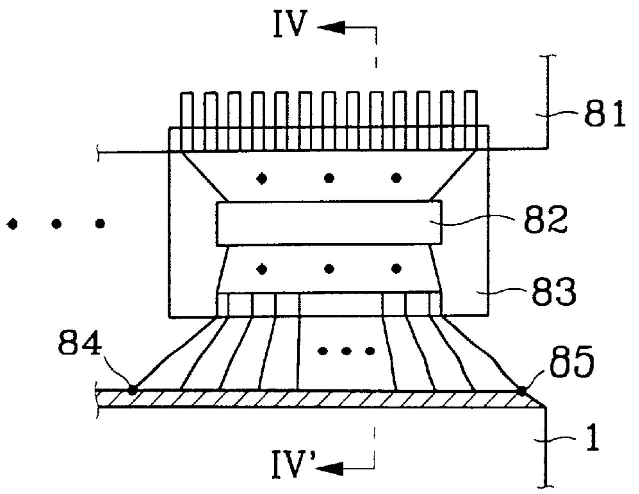
FIG. 3 is a plan view of a distorted signal generator of FIG. 1 on a driver integrated circuit of a liquid crystal panel.

FIG. 3 illustrates a plan view of an embodiment of a distorted signal sensor 5 of FIG. 1, wherein the source distorted signal sensor 5 is incorporated into the source driver 2. As shown in FIG. 3, a driver integrated circuit (driver IC) 82 is connected to a printed circuit board (PCB) 81 and the liquid crystal panel 1 using a tape automated bonding (TAB) method, where the driver IC 82 is attached to a tape carrier package (TCP) 83. One end of the TCP 83 is bonded to the liquid crystal panel 1 and the other end is bonded to the PCB 81. It will be understood that the driver IC 82 may correspond to the source driver 2 of FIG. 1. A conventional liquid crystal panel may include sixteen or more driver ICs.

Still referring to FIG. 3, there are two dummy ports 84 and 85 in the driver IC 82. According to the invention, one of the dummy ports is used to apply a common electrode voltage Vcom to the liquid crystal panel. The other dummy port is used to detect the distorted common electrode voltage DVcom. When there are a plurality of driver ICs in one liquid crystal panel, such as a gate driver IC and a source driver IC, one dummy port of one driving IC may be used as the distorted signal sensor 5. Alternately, a plurality of dummy ports may be used as the distorted signal sensor 5. Also, preferably, the dummy port of the gate driver IC which is most distant from the source driver IC is preferably used as the distorted signal sensor 5.

Figure 4:
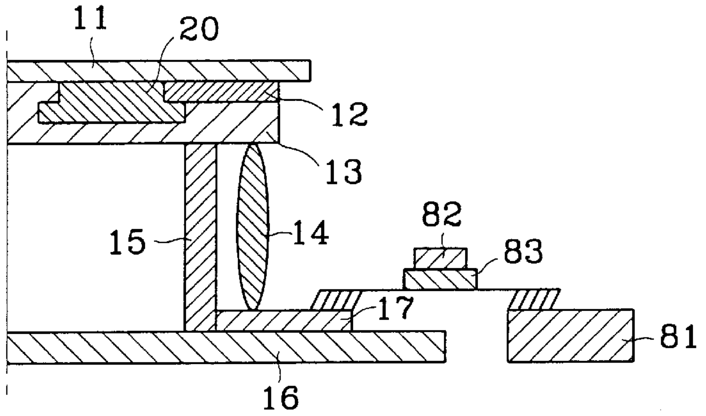
FIG. 4 is a cross-sectional view of FIG. 3 taken along line IV—IV.

Referring now to FIG. 4, a cross-sectional view of FIG. 3 taken along the line IV—IV is illustrated. As shown in FIG. 4, 11 is an upper substrate and 12 is a black matrix. Reference number 13 is an upper transparent common electrode and 14 is a silver conductive film. Reference number 15 is a seal and 16 is a lower substrate including a plurality of TFTs, a plurality of pixel electrodes and a plurality of conductive lines 17.

When a common electrode voltage Vcom is applied via the dummy port 84 of FIG. 3, the common electrode Vcom from the dummy port 84 of the driver IC 82 is applied to the upper transparent common electrode 13 through the silver conductive film 14. The distorted common electrode voltage DVcom passes through the driver IC via the conductive line 17 and the dummy port 85. This voltage DVcom is provided to the level shift circuit 6 which is populated on the PCB 81. It will be understood that if the distorted common electrode DVcom does not provide sufficient current to drive the level shift circuit 6, an amplifier can be added between the distorted signal sensor and the level shift circuit 6.

Figure 5:
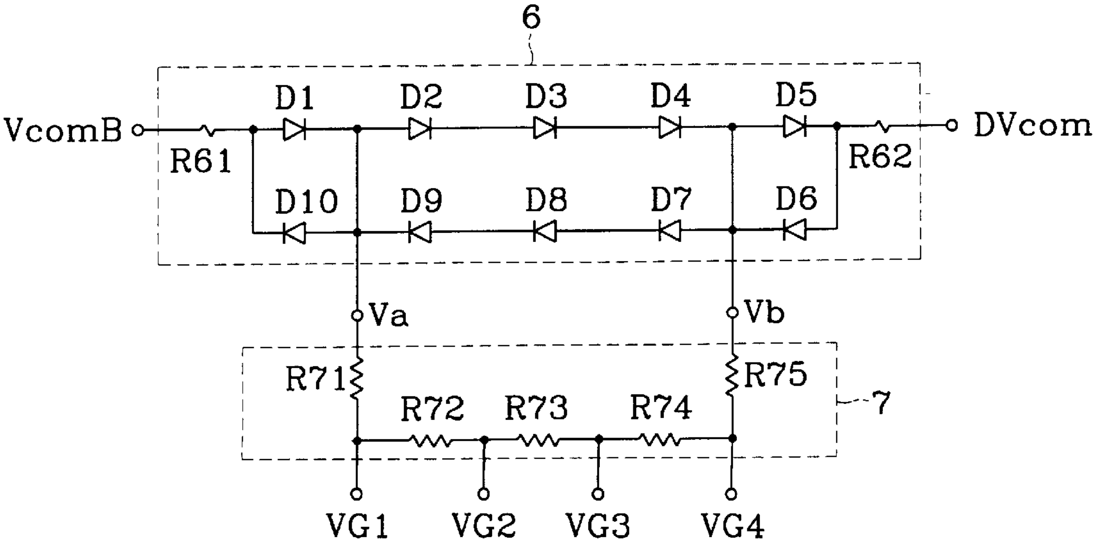
FIG. 5 is a detailed circuit diagram of an embodiment of a level shift circuit and a gray voltage generator of FIG. 1.
Figure 9A:
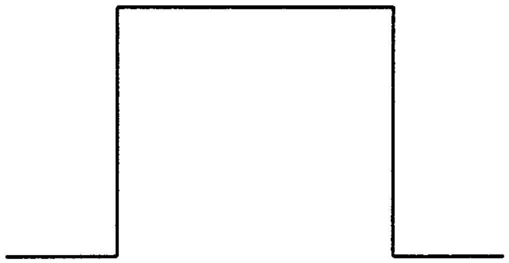
FIG.9A (Prior Art)
FIGS. 9A and 9B are waveforms which illustrate a common electrode voltage which is applied and a distorted voltage which is produced in the circuit of FIG. 8.
Figure 9B:
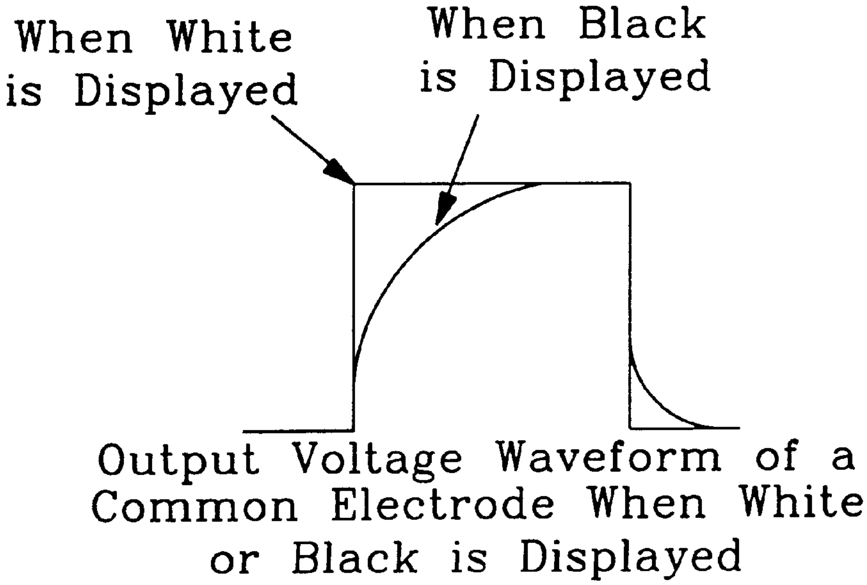
FIG.9B (Prior Art)
Figures 10A, 10B:
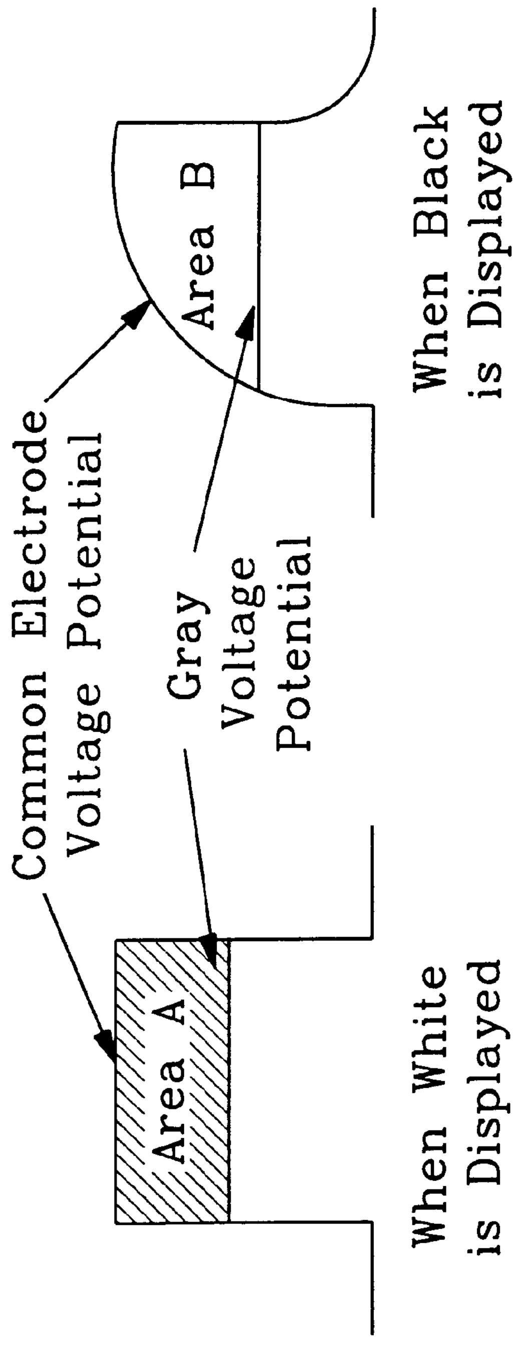
FIG.10A (Prior Art) FIG.10B (Prior Art)
FIGS. 10A and 10B are waveforms illustrating a voltage which is applied to an adjacent cell when white and black, respectively, is displayed in the circuit of FIG. 8.

Referring now to FIG. 5, a detailed embodiment of level shift circuit 6 and gray voltage generator 7 will be described. As shown in FIG. 5, the level shifter 6 preferably includes a plurality of first diodes D1, D2, D3, D4 and D5 which are serially connected in a first polarity between the voltage VcomB which is complementary to the voltage which is applied to the common electrode, and the voltage DVcom which is sensed on the common electrode. A like plurality of second diodes D6, D7, D8, D9 and D10 are serially connected in a second polarity opposite the first polarity, between voltages VcomB and DVcom. The diodes may be connected between the voltages via resistors R61 and R62.

Still referring to FIG. 5, a pair of reference taps Va and Vb are provided to tap at least a pair of intermediate nodes between the plurality of first diodes and the like plurality of second diodes. In particular, reference voltage Va is detected between diodes D1 and D2 and between diodes D9 and D10. Reference voltage Vb is detected between diodes D4 and D5 and between diodes D6 and D7.

Still referring to FIG. 5, gray voltage generator 7 includes a plurality of resistors R71–R75 which are serially connected between the pair of reference taps Va and Vb. A plurality of resistor taps VG1–VG4 are located between adjacent ones of the resistors.

It will be understand that the level shift circuit and gray voltage generator of FIG. 5 generates four gray voltage levels which are applied to source driver 2. However, it will be understood that fewer or greater number of gray voltage levels may be generated.

Driving methods for TFT-LCDs will now be described in connection with FIGS. 6, 7A and 7B.

When operations begin, signals for driving a TFT of the liquid crystal panel 1 are provided from the source driver 2 and the gate driver 3. The timing circuit 4 provides the common electrode voltage Vcom and the complementary common electrode voltage VcomB to the common electrode of the liquid crystal panel. A predetermined voltage which is determined by the gate driver 3 and the source driver 2 are applied to each liquid crystal cell in a liquid crystal panel. Accordingly, each liquid crystal cell provides a display having an intensity which is proportional to the applied voltage.

Referring again to FIG. 2, the voltage which is applied to the common electrode Vcom, less the voltage drop which is produced by the panel resistance Rcom, is applied to one terminal of each liquid crystal cell. The drain voltage from each thin film transistor is applied to the other terminal of each liquid crystal cell. When a voltage is applied to the gate of the thin film transistor, the source voltage is transmitted to the drain. The voltage applied to the source terminal of each thin film transistor is the signal from the source driver 2 and is the gray voltage for the gray scale display.

As already described, the distorted signal sensor 5 may include an electrode pad and an amplifier. In order to detect the distorted common electrode voltage, the electrode pad is preferably placed between an electrode where the common electrode voltage Vcom is applied and another electrode, and most preferably in a position which is most distant from the electrode where the common electrode voltage Vcom is applied. The amplifier may be a conventional push-pull amplifier or other conventional amplifier. The distorted common electrode voltage DVcom and the complementary common electrode voltage VcomB are provided to the level shift circuit 6.

Referring again to FIG. 5, the two groups of serially connected diodes D1–D5 and D6–D10 have opposite polarities so that current can flow through only one group of serially connected diodes at a time. Which group will depend upon the voltage difference between VcomB and DVcom. For example, when VcomB is larger than DVcom, current flows only through diodes D1–D5. Conversely, when DVcom is larger than VcomB, current flows through diodes D6 and D10. The voltage difference between VcomB and DVcom is detected to produce the reference voltages Va and Vb. The two voltages Va and Vb are divided by the five resistors R71–R75 to produce the four gray voltages VG1–VG4. The gray voltages are provided to the source driver 2. A switching element within the source driver 2 selects one of the four gray voltages which are provided, and the selected voltage is output to the thin film transistor on the liquid crystal panel 1 using conventional techniques. As shown in FIG. 6, the waveform of the gray voltage VG1–VG4 follows that of the distorted common electrode voltage DVcom from the liquid crystal panel 1.

Referring now to FIG. 7A, the area A indicates the difference between the distorted common electrode voltage DVcom and the applied gray voltage when the adjacent liquid crystal cells display white. Thus, the area A of FIG. 7A corresponds to the voltage which is applied to the liquid crystal cell when the adjacent liquid crystal cells display black. In contrast, as shown in FIG. 7B, according to the present invention, the gray voltage is proportional to the distorted level of the distorted common electrode voltage DVcom which is applied to the liquid crystal cell. Accordingly, there is little difference between the area A and the area B. It is thus possible to display the desired amount of gray because the desired amount of gray voltage is present in the liquid crystal cell regardless of the display state of adjacent liquid crystal cells. Crosstalk is thereby reduced or eliminated.

Accordingly, the TFT-LCD generates a reference voltage which is proportional to the distorted level of the distorted common electrode voltage, generates the gray voltage according to the generated reference voltage and provides the source driver with the generated reference voltage. Thus, although the common electrode voltage is distorted, the generated reference voltage can properly reflect the desired gray voltage. Although the common electrode is distorted, a constant potential difference can thus be applied to the liquid crystal cell. Crosstalk is thereby reduced or eliminated.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A circuit which drives a liquid crystal display including a plurality of liquid crystal cells and a plurality of thin film transistors, a respective pair of which is serially connected between a common electrode and a plurality of drivers, the driving circuit comprising:

a sensor which senses a voltage drop on the common electrode; and a compensator which is responsive to the sensor, to provide at least one driver signal level to the plurality of drivers which is a function of the sensed voltage drop on the common electrode, to thereby reduce distortions in the liquid crystal cells which are caused by the voltage drop on the common electrode;

wherein the compensator comprises:

a level shifter, which is responsive to the magnitude of the sensed voltage drop on the common electrode to generate first and second voltages; and a gray scale voltage generator which is responsive to the first and second voltages, to generate more than two gray scale voltages and to apply the more than two gray scale voltages to the plurality of drivers.

2. A driving circuit according to claim 1 wherein the sensor comprises a pad which is electrically connected to the common electrode.

3. A driving circuit according to claim 1:

wherein the plurality of drivers are contained in a driver integrated circuit;

wherein the driver integrated circuit further includes a circuit for applying a common voltage to the common electrode, and wherein the sensor is also included in the driver integrated circuit.

4. A driving circuit according to claim 1 further comprising first and second pads connected to the common voltage electrode, the common voltage being applied to the first pad, and the sensor being connected to the second pad.

5. A driving circuit according to claim 3 wherein the sensor further comprises an amplifier which amplifies the voltage drop on the common electrode.

6. A driving circuit according to claim 1 wherein the level shifter comprises:

a plurality of first diodes which are serially connected in a first polarity between a voltage which is complementary to a voltage which is applied to the common electrode and a voltage which is sensed on the common electrode; and a like plurality of second diodes which are serially connected in a second polarity opposite the first polarity, between the voltage which is complementary to a voltage which is applied to the common electrode and the voltage which is sensed on the common electrode; and a pair of reference taps which tap at least a pair of intermediate nodes between the plurality of first diodes and the like plurality of second diodes.

7. A driving circuit according to claim 6 wherein the gray scale voltage generator comprises:

a plurality of resistors which are serially connected between the pair of reference taps; and a plurality of resistor taps between adjacent ones of the resistors.

8. An apparatus for driving a liquid crystal display which includes a plurality of liquid crystal cells and a plurality of thin film transistors, a respective pair of which is serially connected between a common electrode and a plurality of drivers, the driving apparatus comprising:

means for sensing a voltage drop on the common electrode; and compensating means, responsive to the sensing means, for providing at least one driver signal level to the plurality of drivers which is a function of the sensed voltage drop on the common electrode, to thereby reduce distortions in the liquid crystal cells which are caused by the voltage drop on the common electrode;

wherein the compensating means comprises:

level shifting means, responsive to the magnitude of the sensed voltage drop on the common electrode, for generating first and second voltages; and gray scale voltage generating means, responsive to the first and second voltages, for generating more than two gray scale voltages and for applying the more than two gray scale voltages to the plurality of drivers.

9. An apparatus according to claim 8 wherein the sensing means comprises a pad which is electrically connected to the common electrode.

10. An apparatus according to claim 8:

wherein the plurality of drivers are contained in a driver integrated circuit;

wherein the driver integrated circuit further includes means for applying a common voltage to the common electrode, and wherein the sensing means is also included in the driver integrated circuit.

11. An apparatus according to claim 8 further comprising first and second pads connected to the common voltage electrode, the common voltage being applied to the first pad, and the sensing means being connected to the second pad.

12. An apparatus according to claim 10 wherein the sensing means further comprises means for amplifying the voltage drop on the common electrode.

13. An apparatus according to claim 8 wherein the level shifting means comprises:

a plurality of first diodes which are serially connected in a first polarity between a voltage which is complementary to a voltage which is applied to the common electrode and a voltage which is sensed on the common electrode; and a like plurality of second diodes which are serially connected in a second polarity opposite the first polarity, between the voltage which is complementary to a voltage which is applied to the common electrode and the voltage which is sensed on the common electrode; and a pair of reference taps which tap at least a pair of intermediate nodes between the plurality of first diodes and the like plurality of second diodes.

14. An apparatus according to claim 13 wherein the gray scale voltage generating means comprises:

a plurality of resistors which are serially connected between the pair of reference taps; and a plurality of resistor taps between adjacent ones of the resistors.

15. A liquid crystal display comprising:

a plurality of liquid crystal cells;

a plurality of thin film transistors;

a plurality of drivers, a respective one of the liquid crystal cells and thin film transistors being serially connected between a common electrode and the plurality of drivers;

a sensor which senses a voltage drop on the common electrode; and a compensator which is responsive to the sensor, to provide at least one driver signal level to the plurality of drivers which is a function of the sensed voltage drop on the common electrode, to thereby reduce distortions in the liquid crystal cells which are caused by the voltage drop on the common electrodes;

wherein the compensator comprises:

a level shifter, which is responsive to the magnitude of the sensed voltage drop on the common electrode to generate first and second voltages; and a gray scale voltage generator which is responsive to the first and second voltages, to generate more than two gray scale voltages and to apply the more than two gray scale voltages to the plurality of drivers.

16. A liquid crystal display according to claim 15 wherein the sensor comprises a pad which is electrically connected to the common electrode.

17. A liquid crystal display according to claim 15:

wherein the plurality of drivers are contained in a driver integrated circuit;

wherein the driver integrated circuit further includes a circuit for applying a common voltage to the common electrode, and wherein the sensor is also included in the driver integrated circuit.

18. A liquid crystal display according to claim 15 further comprising first and second pads connected to the common voltage electrode, the common voltage being applied to the first pad, and the sensor being connected to the second pad.

19. A liquid crystal display according to claim 17 wherein the sensor further comprises an amplifier which amplifies the voltage drop on the common electrode.

20. A liquid crystal display according to claim 15 wherein the level shifter comprises:

a plurality of first diodes which are serially connected in a first polarity between a voltage which is complementary to a voltage which is applied to the common electrode and a voltage which is sensed on the common electrode; and a like plurality of second diodes which are serially connected in a second polarity opposite the first polarity, between the voltage which is complementary to a voltage which is applied to the common electrode and the voltage which is sensed on the common electrode; and a pair of reference taps which tap at least a pair of intermediate nodes between the plurality of first diodes and the like plurality of second diodes.

21. A liquid crystal display according to claim 20 wherein the gray scale voltage generator comprises:

a plurality of resistors which are serially connected between the pair of reference taps; and a plurality of resistor taps between adjacent ones of the resistors.

22. A method for driving a liquid crystal display which includes a plurality of liquid crystal cells and a plurality of thin film transistors, a respective pair of which is serially connected between a common electrode and a plurality of drivers, the driving method comprising the steps of:

sensing a voltage drop on the common electrode; and providing at least one driver signal level to the plurality of drivers which is a function of the sensed voltage drop on the common electrode, to thereby reduce distortions in the liquid crystal cells which are caused by the voltage drop on the common electrode;

wherein the providing step comprises the steps of:

generating first and second voltages in response to the magnitude of the sensed voltage drop on the common electrode;

generating more than two gray scale voltages in response to the first and second voltages; and applying the more than two gray scale voltages to the plurality of drivers.

23. A driving method according to claim 22 wherein the following step is performed between the sensing step and the providing step:

amplifying the voltage drop on the common electrode.

* * * * *